United States Patent [19]
Cole et al.

[11] Patent Number: 5,091,939
[45] Date of Patent: Feb. 25, 1992

[54] METHOD AND APPARATUS FOR PASSWORD PROTECTION OF A COMPUTER

[75] Inventors: James F. Cole, Palo Alto; Jerald J. Keeran, San Jose, both of Calif.

[73] Assignee: Tandy Corporation, Ft. Worth, Tex.

[21] Appl. No.: 543,120

[22] Filed: Jun. 22, 1990

[51] Int. Cl.$^5$ .............................................. H04K 1/00
[52] U.S. Cl. ...................................... 380/25; 380/23; 340/825.33; 902/5; 235/382
[58] Field of Search ................................... 380/23–25; 364/286.4, 286.5, 260.81, 969.4, 949.7; 340/825.33; 902/5; 238/382, 382.5

[56] References Cited

U.S. PATENT DOCUMENTS

| | | | |
|---|---|---|---|
| 4,209,782 | 6/1980 | Donath et al. | 235/382.5 |
| 4,591,967 | 5/1986 | Mattes et al. | 364/200 |
| 4,720,860 | 1/1988 | Weiss | 380/25 |
| 4,801,787 | 1/1989 | Suzuki | 235/382.5 X |
| 4,856,062 | 8/1989 | Weiss | 380/25 |
| 4,941,175 | 7/1990 | Enescu et al. | 380/23 |

OTHER PUBLICATIONS

Hummel, Robert; "Languages", *PC Magazine*, vol. 7, No. 1, p. 375, Jan. 12, 1988.

*Primary Examiner*—Thomas H. Tarcza
*Assistant Examiner*—Tod Swann
*Attorney, Agent, or Firm*—Townsend and Townsend

[57] ABSTRACT

A method and apparatus for password protecting a personal, laptop or single user computer. The user's password entry is compared to the value of a secondary password retained by the computer as well as the value of the user's stored primary password. The user may thus access the computer when his primary password is corrupted or forgotten by obtaining an alternate password from the computer manufacturer which matches the secondary password generated or stored by the computer. The operation of the method and the organization of the apparatus make the secondary and alternate passwords valid for a limited time, thereby preserving the overall integrity of the password protection system. The primary, secondary and alternate passwords may be encrypted for added security.

32 Claims, 4 Drawing Sheets

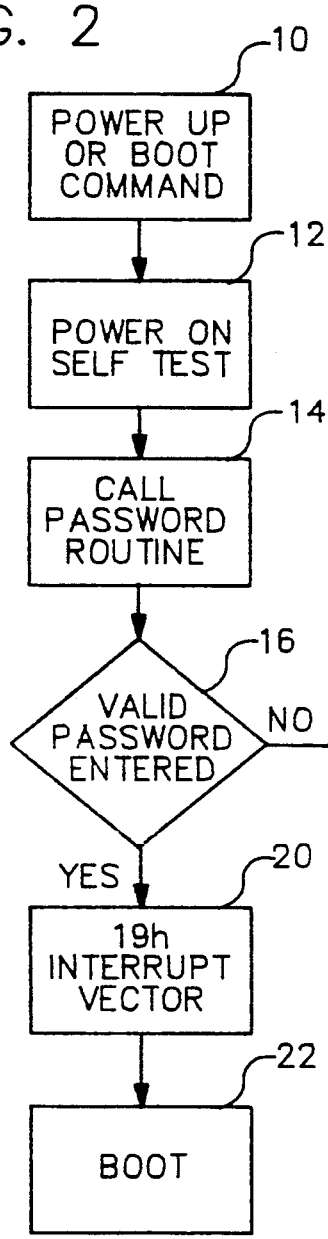
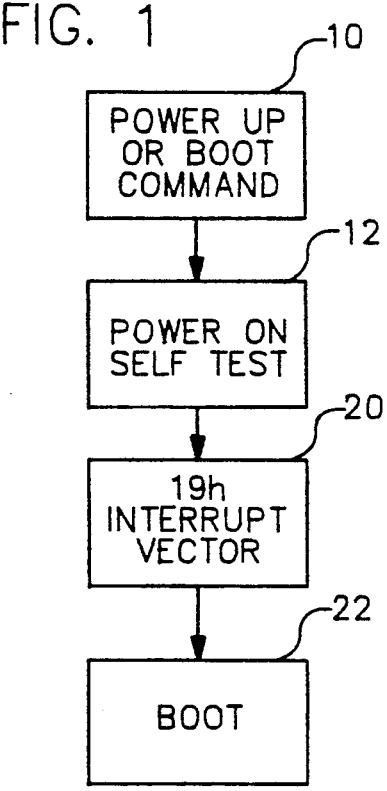
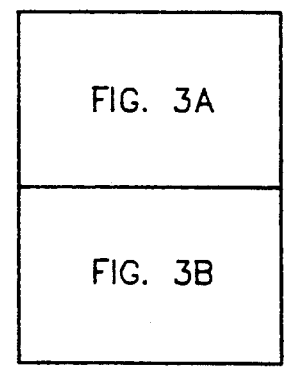

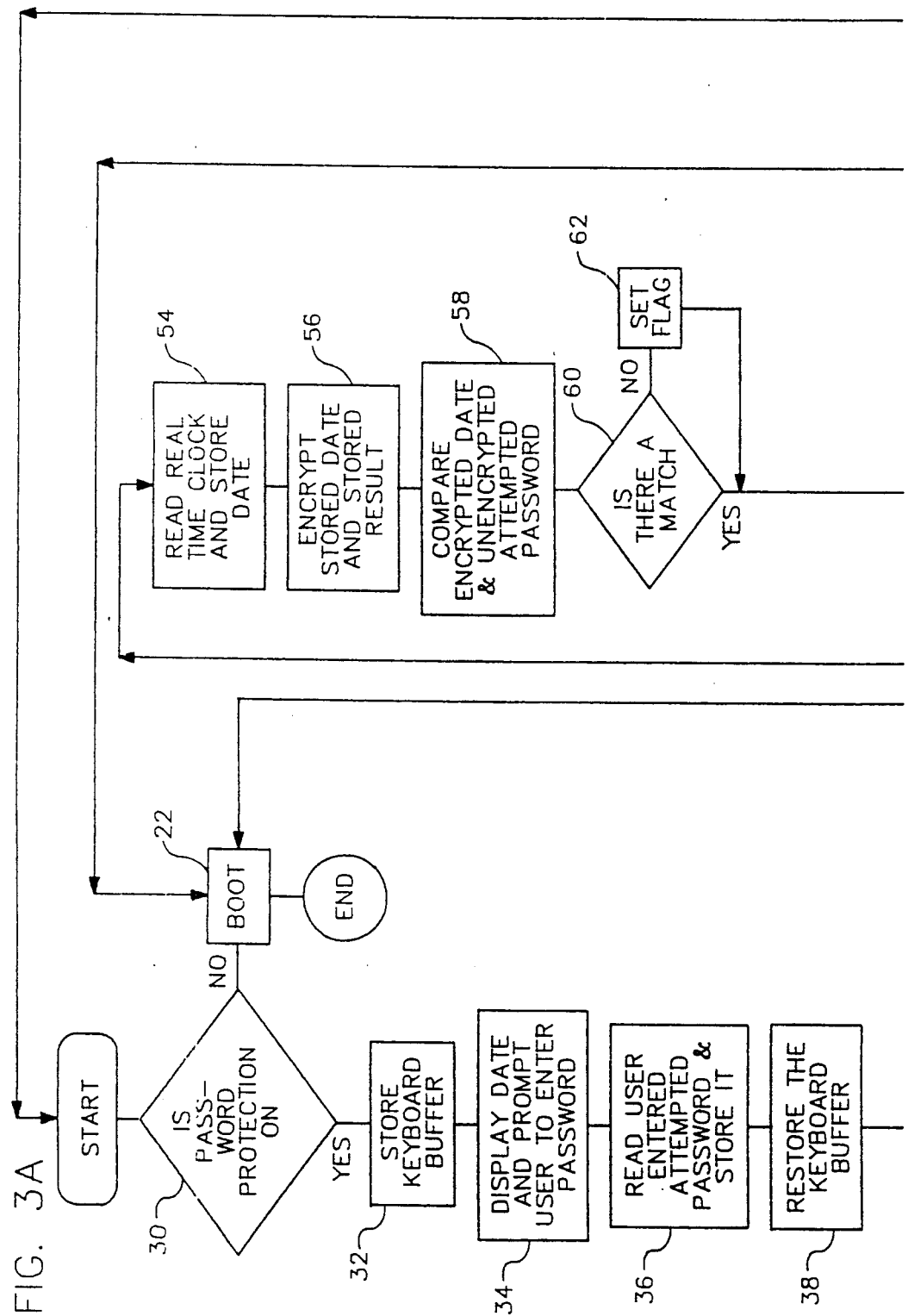

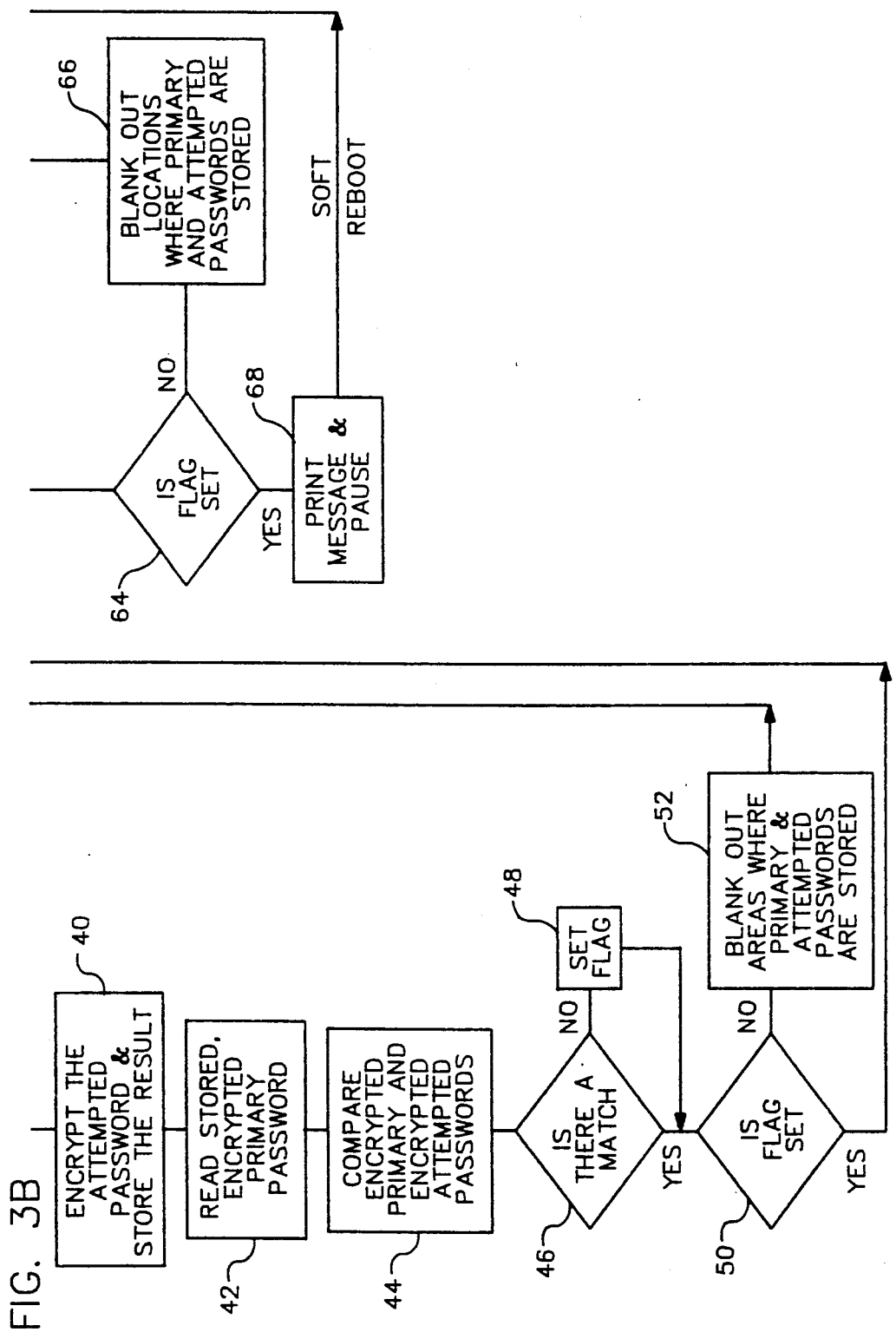

METHOD AND APPARATUS FOR PASSWORD PROTECTION OF A COMPUTER

BACKGROUND OF THE INVENTION

The present invention relates to password protection to control access to a computer and particularly to a method and apparatus usable when the user has forgotten the password.

Password protection schemes are commonly employed to control access to computer systems. In such schemes, only authorized computer users are assigned a password. Each time the user wishes to use the computer he must first enter his/her password. If the computer recognizes the password as valid, the user will be permitted to access the data and/or execute the programs stored therein. Persons not entering a valid password are unable to access the data or program information. In this way, a password protection system protects the proprietary or confidential information retained by the computer and prevents unauthorized use.

To maintain the integrity of the password protection system, however, authorized users are commonly instructed to refrain from writing or otherwise permanently recording their passwords. This procedure prevents unauthorized users from obtaining a valid password and accessing the computer. This procedure necessarily requires that an authorized user memorize his/her password.

If the authorized user forgets the assigned password, he/she cannot use the computer. In large computer systems a systems supervisor typically maintains operation of the computer. In the event of a forgotten password, the systems supervisor can verify the user's identify, issue a new password to the authorized user and eradicate the old, forgotten, password from computer memory.

For single user computers such as personal computers (PCs) and laptop computers, the password is typically set by the user. No systems operating personnel are available to assist in accessing the computer once the password is lost or forgotten. A forgotten or unusable password renders such a computer useless. To restore use, service center repair personnel would require physical access to the computer to either physically reorder the computer memory and software or to power down the chip containing the password information. A forgetful user would thus incur a shipping expense, a repair bill, and the loss of the computer for an extended period. These operational constraints made password protection infeasible or impractical for PCs or lap top computers in the past; and users were denied the security benefits of such a protection system.

SUMMARY OF THE INVENTION

The present invention provides a means for accessing a password protected computer when the password is lost or unusable. The present invention thus makes a password protection system feasible for PC's and lap top computers. This feature is especially desireable for lap top computers since they are by design frequently transported from place to place; and unlike a PC, access cannot always be controlled by limiting access to the computer's physical location.

According to one embodiment of the invention, the user enters an attempted password. A primary password is stored in the computer as valid, i.e. the standard against which an attempted password is to be measured. The computer compares the entered password to the valid primary password. If the entered password does not match the primary valid password, the computer then compares the entered password to a secondary valid password stored or generated by the computer.

The manufacturer or an authorized agent can execute, on a separate device, a program to obtain the secondary password. When a user forgets his primary password, he/she calls the manufacturer. Upon verification of the user's identity, the manufacturer or authorized agent supplies an alternate password to the user. The user enters this alternate password, when prompted, as the attempted password. When the computer compares this attempted password with the stored or generated secondary valid password, a match is found, permitting the user to access the computer and enter a new primary password. Thus when the primary password is forgotten, the user requires only a telephone to regain access to the computer. This system extends the benefits of password protection to PC and laptop computers by eliminating the need for expensive repairs in the event of a forgotten password.

According to another embodiment of the invention, the secondary valid password is based on (i.e., algorithmically obtainable from) information external to the computer, i.e. information which, regardless of whether it is stored in the computer, is information which can be accessed without obtaining the information from the computer. One example of such external information is the date. Either the user or the computer service personnel can access the date by consulting a calendar, and thus need not obtain the date from the computer. Within the computer, date information is held by the computer's real time clock. The secondary valid password is preferably the result of encrypting all or part of the date information held by the computer's real time clock. Thus, the secondary valid password is not user-settable, in the sense that the user cannot define the secondary valid password in such a way that an attempted password known to the user will match the secondary valid password. Of course, the user can affect the secondary valid password by, for example, resetting the computer's real time clock to a different date. This method has the advantage of enhancing computer security by providing a unique and dynamic secondary password valid for only a limited period.

According to yet another embodiment of the invention, both the primary and secondary password information are encrypted by predetermined encryption algorithms. The attempted password is encrypted by the same algorithm used to encrypt the user-set password and compared to the stored, encrypted, user-set valid primary password. If there is no match, the unencrypted attempted password is compared to the stored and generated secondary valid password. In one embodiment the secondary valid password is the result of encrypting data which is external to the computer (e.g. the date) or displayed data (e.g. the RTC-stored date). In such a case, the user, after verifying his/her identity, is provided with an encrypted date which will match the secondary valid password. Encryption further enhances computer security.

In the case of the attempted password, which is supplied by, e.g., the manufacturer, the password can be supplied to the user with extra bits attached. This step prevents a user or any other person from deducing the steps executed to produce the secondary password, thereby compromising the password protection of an entire computer model line.

BRIEF DESCRIPTION OF DRAWINGS

FIG. 1 is a flow chart describing the prior art boot up process for a personal computer or laptop computer;

FIG. 2 is a flow chart describing the prior art boot up process for computers with password protection;

FIGS. 3A and 3B is a flow chart describing a method for password protecting a personal or laptop computer according to the present invention.

DETAILED DESCRIPTION OF THE PREFERRED EMBODIMENTS

Figure 4:
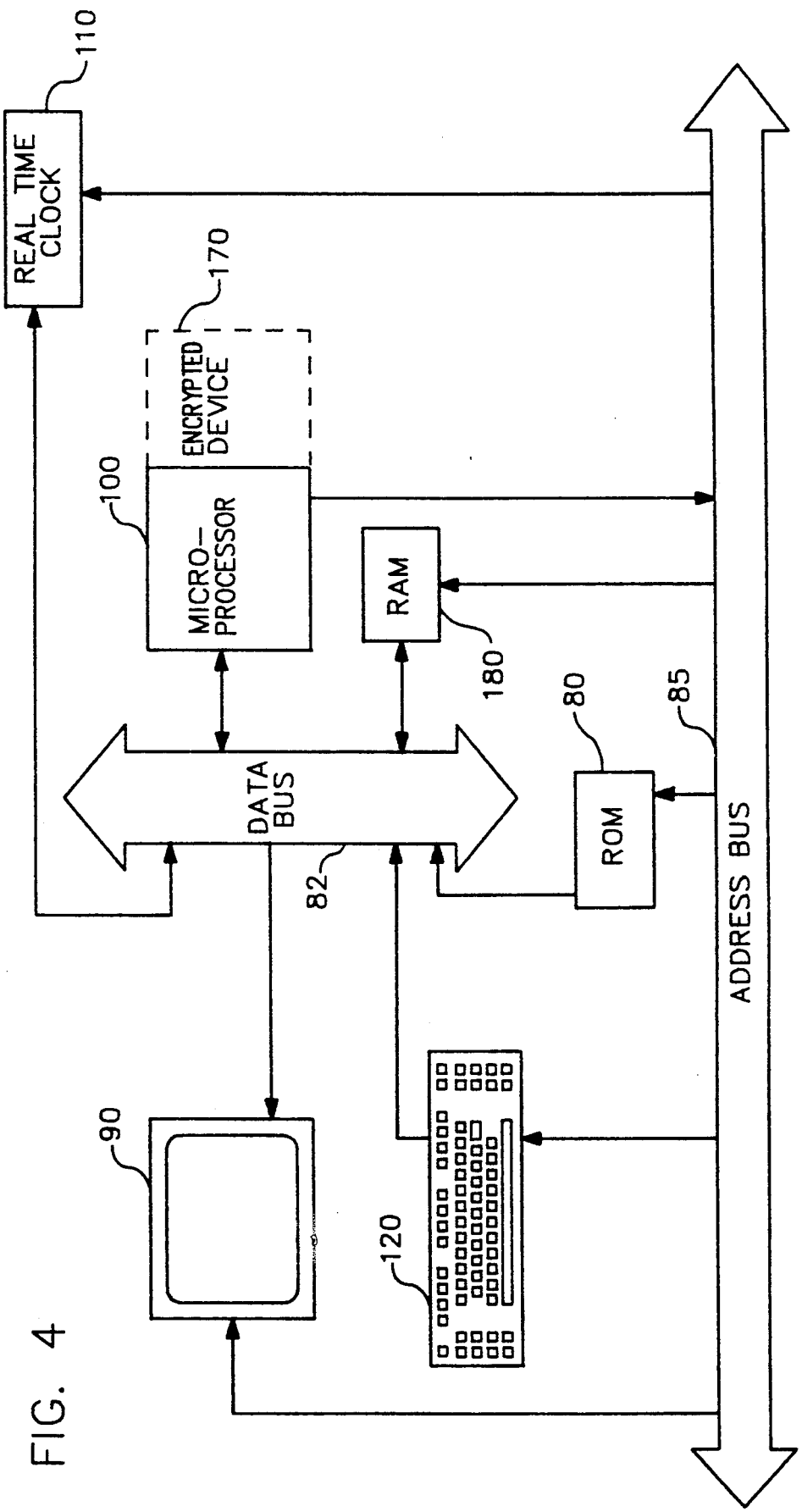
FIG. 4 is a functional block diagram depicting an apparatus for password protecting a personal or laptop computer according to the present invention.

FIG. 1 depicts the prior art boot up process for a personal or laptop computer. Turning the computer system on or inputting a boot command 10 initiates a sequence of computer self-tests 12. Upon completion of self-tests 12, an interrupt vector 20 is written to hardware and the computer system proceeds with the boot up sequence, 22. As is evident from the figure, no built-in, effective password protection provisions exist in the prior art boot up process.

FIG. 2 depicts the prior art boot up procedure incorporating password protection as used on multiple user systems large enough to employ a systems operator. In this procedure, the computer conducts selftests 12 upon receiving power on or boot up command 10, and then calls password program subroutines 14. Subroutines 14 check to see if the user enters a password which matches a password stored in computer memory. If the entered and stored passwords do not match, an invalid password has been entered. The computer informs the user of the invalid entry 18, and prevents further access to the computer by halting the boot up sequence. If the passwords do match, then the computer issues an interrupt vector 20 or otherwise enables boot up and proceeds with boot up sequence 22.

FIG. 3 describes a method of password protecting a computer according to the present invention. In this embodiment, the computer first ascertains whether password protection exists and/or is enabled 30. If no password protection exists or if password protection is disabled (e.g., because of user command) the computer executes the commands necessary to complete boot up of the computer 22. The computer can also be configured to compare a bit sum of the stored password to a checksum value stored in non-volatile memory. If the values disagree, the stored password may have been corrupted and the computer can be configured to display a message and proceed as if the password protection feature were disabled.

When password protection does exist, the 15-character keyboard buffer is saved to memory 32. This is done in order to preserve keyboard entries made by the user prior to the password prompt appearing. After the keyboard buffer is saved to memory, the computer prompts the user to enter a password, 34. The password prompt may appear in any one of several preselected languages stored in computer memory.

The computer also displays the current value of the computer real time date clock (RTC) in conjunction with the password prompt 34. Displaying the date clock value in addition to the password prompt is optional but preferred because in the embodiment of the invention as described, a back up or secondary, password encrypted and stored within the computer is derived from the date stored within the computer. The date display therefore makes apparent any deviation between the computer date clock and the actual calendar date. If the secondary password is derived from information other than the date, this information is preferably displayed with the password prompt. As part of the computer self-tests, the validity of the RTC and the viability of the battery powering the RTC and nonvolatile memory is checked to provide confidence in the information displayed.

The primary password is a password set by the user. After the user sets the password, it is encrypted according to a pre-defined encryption algorithm to form a first acceptable code. The preferred embodiment of the subject invention utilizes an exclusive OR algorithm to encrypt password information, such as that described in Hummel, et al., "Languages" P.C. Magazine. Vol. 7, n. 1, p. 375 ff, Jan. 12, 1988. Other encryption algorithms may also be used as will be apparent to those skilled in the art. The first acceptable code is stored in nonvolatile memory.

In response to the password prompt, the user enters an attempted password 36. The computer reads the attempted password, truncates the attempted password to a predetermined number of characters and converts the input to upper case 36. The ASCII code for the truncated attempted password forms the second attempted code (discussed below) and is stored in memory 36. The display does not echo the entered keystrokes, but may echo neutral characters, such as asterisks. The previously stored keyboard buffer is restored at this time, 38. The microprocessor then encrypts the truncated attempted password entry according to the same encryption algorithm used to encrypt the user-set password. The result forms the first attempted code and is stored in memory 40.

The microprocessor retrieves the first acceptable code (i.e., the stored, encrypted primary password) from memory 42 and compares it with the first attempted code (i.e., the encrypted attempted password). If the values of the encrypted attempted password and the encrypted stored primary password match, the microprocessor safeguards the password information by writing zeros at the temporary locations used to store the information, 52, and then proceeds to boot the computer 22.

When the values of the stored encrypted primary password and the encrypted attempted password do not match, the user has either forgotten his password, incorrectly entered the password, or the stored primary password information has been corrupted. In prior art personal computer password protection schemes, the computer would execute the commands to complete a reboot of the computer and reprompt the user for the proper password information, see FIG. 2. This procedure denies access to the authorized user with a corrupted or forgotten password. In large systems, systems operating personnel simply issue a new valid password and eradicate the old password from memory. In small personal computer or laptop computer systems, where such computer operating personnel do not exist, service technicians require physical access to the computer memory to restore access. This limitation in prior art password protection prevents the users of personal and laptop computers from obtaining the benefits of password protection.

According to the method of the present invention, however, after setting a flag indicating the initial mismatch 48, the computer generates or retrieves from storage a valid secondary password. The secondary password can be any of a number of types of password. It must, however, be based on either information displayed by the computer or information external to the computer, although such external information may also be stored internally in the computer. A password is based on information if it can be unambiguously generated by a well-defined algorithm using such information.

In one preferred embodiment, the secondary password is generated by reading and then encrypting the value of the date stored in the real time clock, 54 and 56. Encryption is done using an encryption algorithm which is known to or available to the manufacturer, as described below. The encrypted information forms the second acceptable code and is stored in memory.

Using the date to generate the second acceptable code provides a back-up password system which remains valid only during the period required to gain access to the computer (i.e., only for one day or less). A limited period of back-up password validity improves system security by preventing a previously authorized, but subsequently unauthorized, user from re-using a previously obtained back-up password to access the machine; and by denying the authorized user of one machine unauthorized access to another's machine at a future date.

According to a preferred embodiment of the subject invention, when the first attempted code does not match the first acceptable code, the computer then compares the second attempted code (i.e., the unencrypted attempted password) to the second acceptable code (i.e., the encrypted secondary password) 58. If these values do not match, the computer generates an error message, 68, executes a soft reboot, and redisplays the date and password prompt 34.

If no password match is found because the user has mistyped his password, the user simply retypes the password correctly after the soft reboot and the computer re-executes operations 30 through 52 and boots the computer 22. If no password match exists because the user has a forgotten or corrupted primary password, the user calls the computer manufacturer or its authorized representative to obtain a valid alternate password. If the password is corrupted, the checksum will not match in most cases, and the computer will reboot. There is a small chance that the password in nonvolatile RAM will get corrupted and the checksum will still match. In these cases, the secondary password would be used to gain entry.

The manufacturer is able to issue a valid alternate password because the second acceptable code generated or stored in the user's computer is based on displayed or external information, and because the manufacturer knows, or can generate, the relationship between the displayed or external information and the second acceptable code. For example, in one embodiment, the second acceptable code is related to displayed information, viz. the displayed RTC date, because the secondary password is the result of encrypting some or all of the RTC date. The manufacturer has access to the encryption algorithm and thus can generate a password which will match the second acceptable code stored or generated in the user's computer.

Before issuing the alternate password, the computer manufacturer verifies the identity of the user, e.g. via warranty information or from a list of computer serial numbers and associated owners/users. In this embodiment of the invention, when the caller has adequately identified himself, the computer manufacturer instructs the user to read the date displayed on the computer screen. Using the date given, the manufacturer executes the program, which generates the secondary password, on a separate computing device. The result is a valid alternate password which matches the value of the second acceptable code generated by the user's computer from information stored in the RTC. The alternate password is then provided to the user preferably with random bits attached (subsequently truncated by the user's computer) preventing the user or other persons from deducing the encryption algorithm used to generate the alternate and secondary passwords.

The user then enters the provided alternate password into the computer as an attempted password 36. The encrypted value of this attempted password (i.e., the first attempted code) is then compared to the stored encrypted primary password (i.e., the first acceptable code) and no match is found 44 and 46. The computer then encrypts the current value of the RTC to generate the second acceptable code 56. The values of the second acceptable code and the unencrypted alternate attempted password (i.e., the second attempted code) are then compared and found to match 58 and 60. After blanking out memory locations where the passwords are stored (other than nonvolatile memory) 66, the computer executes the instructions necessary to completely boot up the computer, 22, and provide user access.

FIG. 4 depicts a functional block diagram of an apparatus for implementing password protection in a PC or laptop computer. An instruction set stored in non volatile memory such as read only memory (ROM) 80 controls operation of the apparatus. Data bus 82 transfers information between elements of the apparatus identified by address bus 85.

In this embodiment, video terminal 90, which is an output device, in response to instructions executed by the microprocessor 100 prompts the user to enter the primary password and displays the current value of the real time clock 110. The user then enters the attempted primary password using keyboard input device 120. The attempted password is then transmitted to microprocessor 100 via data bus 82. Microprocessor 100 then calls the encryption device 170 which encrypts the attempted primary password. In the preferred embodiment, encryption device 170 is the microprocessor 100 while it is executing encryption algorithms stored, e.g. in firmware. Alternatively, encryption device 170 can be contained in a separate co-processor unit. Both the encrypted attempted primary password and the unencrypted primary password are stored in memory device 180.

Microprocessor 100 then compares the stored value of the encrypted attempted password with the encrypted primary password stored in non-volatile memory 80. If these values match, microprocessor 100 protects against later attempts to discover the passwords by, e.g. writing zeros into memory device 180 at the location where the encrypted and unencrypted attempted primary password were stored. Microprocessor 100 then proceeds to execute the instructions necessary to boot up the computer.

If the values of the stored encrypted primary password and the encrypted attempted primary password do not match, microprocessor 100 reads the current value of the real time clock 110. The bits corresponding to the date are then encrypted by encryption device 170. The value of the encrypted date and the unencrypted attempted primary password are then compared by microprocessor 100. If these values match, microprocessor 100 writes zeros to the location where the encrypted and unencrypted attempted primary passwords were stored in memory device 180. Microprocessor 100 then proceeds to execute the instructions necessary to boot up the computer. If the values do not match, an error message is displayed on output device 90 and microprocessor 100 executes a soft reboot of the system.

The preferred embodiments have thus been described. Substitutions and modifications, within the scope of the invention, will now be apparent to skilled practitioners in the art. For example, the value used to generate the secondary password and supplied to the manufacturer to obtain the alternate password could be a random number generated by the user's computer and displayed on the screen which remains valid from the point of a first failed attempted password until the entire boot up sequence is completed. Also each computer could be shipped from the factory with its own unique secondary password contained in memory. The manufacturer would retain a list of computer serial numbers and associated passwords. As such, the password based on information external to the computer may also include information stored or generated within the computer. By way of example, the password protection could be implemented by basing the alternate password on the actual date and not displaying the date, thus keeping the user from inferring that the password is based on date. In another scheme, password protection could be implemented by supplying several possible alternate passwords, e.g. to bracket one date or to include a default date. Furthermore, means other than interrupting boot up, e.g. locking the keyboard, could be employed to deny user access. The secondary valid password can be obtained from a register, latch or other data holding or storing device and need not be obtained from non-volatile memory, RAM, or any other specific type of storage. In this sense, memory, as used herein, includes registers, latches, and the like.

Although the invention has been described by way of a preferred embodiment and certain modifications and variations, other modifications and variations can also be used, the invention being defined by the appended claims.

What is claimed is:

1. A method for password-protecting access by a user to a computer, the computer including memory, permitting access when a password has been forgotten or corrupted, the method comprising:

storing in said memory a valid password, said valid password being non-user-settable and said valid password being based on first information, said first information being information which can be obtained without accessing said first information from said computer;

receiving, in said computer, an attempted password, said attempted password obtained by said user, based solely on said first information and said attempted password being obtainable without using information other than said first information;

retrieving from memory said valid password;

translating said valid password into an acceptable code based on said valid password;

comparing an attempted code, based on said attempted password, to said acceptable code; and permitting user access when said attempted code matches said acceptable code.

2. A method, as claimed in claim 1, wherein said first information is based on a date.

3. A method, as claimed in claim 1, wherein said first information is based on a date and wherein there is also at least a first date stored in said computer.

4. A method, as claimed in claim 2, wherein said date is the date on which user access is attempted.

5. A method, as claimed in claim 3, further comprising displaying said date stored in said computer.

6. A method, as claimed in claim 3, further comprising encrypting at least portions of said first date to provide said acceptable code.

7. A method, as claimed in claim 3, wherein said password comprises an ASCII code for at least a portion of said first date.

8. A method, as claimed in claim 1, wherein said attempted code is an ASCII code for at least a portion of said attempted password.

9. A method, as claimed in claim 1, wherein said memory includes non-volatile memory, and wherein said step of retrieving from memory said valid password comprises retrieving a valid password from non-volatile memory.

10. A method, as claimed in claim 1, further comprising encrypting at least portions of said valid password to provide said acceptable code.

11. A method, as claimed in claim 1, wherein said attempted code is identical to at least portions of said attempted password.

12. A method for password-protecting user access to a computer, the computer including memory, the method permitting access when a password has been forgotten or corrupted, the method comprising:

receiving a user-settable first valid password;

storing a first acceptable code based on said received first valid password;

storing in said memory a second valid password, said valid password being non-user-settable and said valid password being based on first information, said first information being information which can be obtained without accessing said first information from said computer;

receiving, in said computer, an attempted password, said attempted password obtained by said user based solely on said first information, and said attempted password being obtainable without using information other than said first information;

comparing a first attempted code, based on said attempted password with said first acceptable code;

retrieving from memory said second valid password;

translating said second valid password into a second acceptable code based on said second valid password;

comparing a second attempted code, based on said attempted password, to said second acceptable code; and permitting user access when said second attempted code matches said second acceptable code.

13. A method, as claimed in claim 12, wherein said first information is based on a date.

14. A method, as claimed in claim 13, wherein said date is the date on which user access is attempted.

15. A method, as claimed in claim 13, further comprising displaying said date using said computer.

16. A method, as claimed in claim 13, further comprising encrypting at least portions of said date to provide said second acceptable code.

17. A method, as claimed in claim 12, wherein said first information is based on a date and wherein there is also at least a first date stored in said computer.

18. A method, as claimed in claim 12, further comprising encrypting said attempted password using a first encryption algorithm to obtain said first attempted code.

19. A method, as claimed in claim 18, further comprising encrypting said first valid password, using said first encryption algorithm, to provide said first acceptable code.

20. A method, as claimed in claim 18, further comprising:
encrypting said second valid password, using said first encryption algorithm to obtain said second acceptable code.

21. A method, as claimed in claim 12, wherein said first information is based on a date and wherein said second valid password is identical to at least portions of said date.

22. A method, as claimed in claim 12, wherein said second attempted code is identical to at least portions of said attempted password.

23. A method, as claimed in claim 12, wherein said second attempted code is an ASCII code for at least a portion of said attempted password.

24. A method, as claimed in claim 12, wherein said memory includes non-volatile memory, and wherein said step of retrieving from memory said second valid password comprises retrieving said second valid password from non-volatile memory.

25. Apparatus for password-protecting user access to a computer, the computer including memory, the apparatus permitting access when a password has been forgotten or corrupted, the apparatus comprising:
means for storing in said memory a valid password, said valid password being non-user-settable and said valid password being based on first information, said first information being information which can be obtained without accessing said first information from said computer;
means, in said computer, for receiving an attempted password, said attempted password obtained by said user based solely on said first information, and said attempted password being obtainable without using information other than said first information;
means for retrieving from memory said valid password,;
means for translating said valid password into an acceptable code based on said valid password;
means for comparing an attempted code, based on said attempted password, to said acceptable code; and
means for permitting user access when said attempted code matches said acceptable code.

26. Apparatus, as claimed in claim 25, further comprising means for storing a date in said computer, and wherein said information is based on said date.

27. Apparatus, as claimed in claim 26, further comprising means for displaying said date stored in said computer.

28. Apparatus, as claimed in claim 26, further comprising means for encrypting at least portions of said date to provide said acceptable code.

29. Apparatus, as claimed in claim 25, further comprising means for encrypting said attempted password to obtain said attempted code.

30. Apparatus, as claimed in claim 25, wherein said memory includes non-volatile memory, and wherein said means for retrieving from memory said valid password comprises means for retrieving said valid password from non-volatile memory.

31. A method for password-protecting user access to a first computer, using a second computer, to permit access when a first password has been forgotten or corrupted, said first computer including information storage devices, and a clock for determining the current date, the method comprising:
storing in said first computer a first password for permitting user-access to said first computer in response to user-input of said first password, at least a portion of said first password being a user-memorized portion;
calculating, in said second computer, a second password to be used to attempt access to said first computer, said calculating of said second password conducted using date information, and without inputting said user-memorized portion of said first password;
outputting, from said second computer, said second password;
inputting, into said first computer, said second password;
calculating, in said first computer, a third non-user-settable password, said third password based on a date obtained from said clock;
comparing in said first computer, said second and third passwords; and
permitting user access to said first computer when said second password matches said third password.

32. A method for password-protecting user access to a first computer, using a second computer, to permit access when a first password has been forgotten or corrupted, said first computer including information storage devices, the method comprising:
storing in said first computer data based on said first password for permitting user-access to said first computer in response to user-input of said first password, at least a portion of said first password being a user-memorized portion;
calculating, in said second computer, a second password to be used to attempt access to said first computer, said calculating of said second password conducted using first information which can be obtained without accessing said first information from said first computer, and without inputting said user-memorized portion of said first password;
outputting, from said second computer, said second password;
inputting, into said first computer, said second password;
calculating, in said first computer, a third non-user-settable password, said third password based on said first information;
translating, in said first computer, said third password into an acceptable code;
translating, in said first computer, said second password into an attempted code;
comparing, in said first computer, said attempted code with said acceptable code; and
permitting user access to said first computer when said attempted code matches said acceptable code.

* * * * *